UNITED STATES PATENT OFFICE.

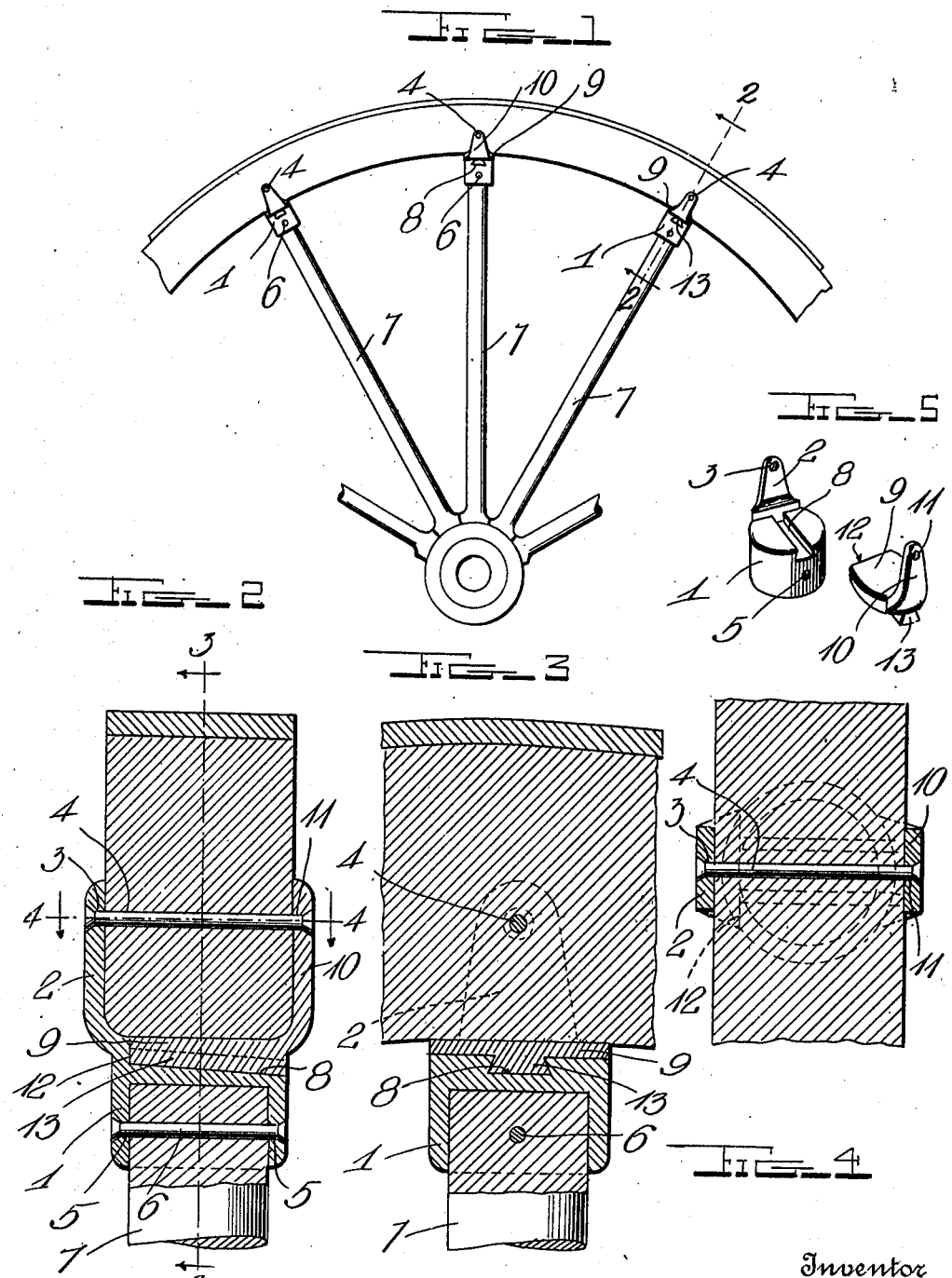

JOHN MARKWICK, OF SCRANTON, PENNSYLVANIA.

SPOKE-SOCKET.

978,045.  Specification of Letters Patent.  Patented Dec. 6, 1910.

Application filed June 2, 1910. Serial No. 564,651.

*To all whom it may concern:*

Be it known that I, JOHN MARKWICK, a citizen of the United States, residing at Scranton, in the county of Lackawanna and State of Pennsylvania, have invented certain new and useful Improvements in Spoke-Sockets; and I do declare the following to be a full, clear, and exact description of the invention, such as will enable others skilled in the art to which it appertains to make and use the same.

This invention relates to improvements in spoke sockets and is especially designed as an improvement over my Patent No. 947,390, dated January 25, 1910.

One object of my invention is to provide a spoke socket by means of which the spokes may be securely and detachably connected with the wheel rim or felly and which provides for the ready removal of a broken spoke and the insertion of a new one when necessary.

Another object of the invention is to provide a spoke socket of this class which will be simple, durable, and inexpensive in construction, efficient and reliable in operation and well adapted to the purpose for which it is designed.

Another object is to provide a spoke socket composed of two members which may be readily connected and detached but which are securely held against separation except laterally in one direction.

With these and other objects in view, the invention consists of certain novel features of construction, combination and arrangement of parts as will be more fully described and particularly pointed out in the appended claim.

In the accompanying drawings: Figure 1 is a side elevation of a portion of a wheel showing this improved socket applied; Fig. 2 is a transverse vertical section taken on the line 2—2 of Fig. 1; Fig. 3 is a detail longitudinal section taken on the line 3—3 of Fig. 2; Fig. 4 is a horizontal section taken on the line 4—4 of Fig. 2; and Fig. 5 is a perspective view of the socket showing the parts separated and in juxtaposition ready for assembling.

In the embodiment illustrated, a spoke socket is shown comprising a tubular spoke engaging member or cap 1 closed at its outer end and having the outer face of said closed end inclined at an oblique angle to the body portion thereof. This cap 1 may be of any suitable shape to correspond with the cross sectional shape of the spoke with which it is to be engaged.

At one side of the closed outer end of the cap 1 is formed a longitudinally extending rim engaging lug or ear 2, having a bolt hole 3 in its free end for the insertion of a bolt 4 which connects it to the wheel rim or felly. This cap 1 is also provided with oppositely disposed apertures, as 5, for the passage of a bolt 6 for connecting it to a spoke 7.

In the outer face of the closed end of the cap 1 is a dove-tailed groove 8, which extends transversely across the cap in a plane at right angles to the lug, the purpose of which will be hereinafter described.

Adapted to coöperate with the spoke member or cap 1 to secure the end of the spoke in position is a wedge and rim engaging member comprising a wedge-shaped plate 9, at one side of which is formed a longitudinally extending substantially right angular rim engaging lug or ear 10 which corresponds in size and shape to the rim engaging lug 2 of the cap 1 and when in operative position is opposite to and in alinement with said lug 2. This lug 10 is provided with a bolt hole 11 disposed in line with the hole 3 in the lug 2 when the parts are assembled and which are designed to receive the bolt 4, above described whereby the socket is securely connected to the rim or felly of the wheel.

The plate 9 preferably corresponds in size and shape to the closed outer end of the cap 1 with which said plate is engaged when the parts are assembled. The thin edge of the wedge plate 9 is preferably provided with a straight edge 12 which is adapted to abut against the inner face of the lug 2 when the parts are assembled to limit the inward movement of said plate. This plate 9 is also provided on its lower face with an undercut rib 13 which extends from the straight edge 12 thereof across the plate and is adapted to be slidably engaged with the undercut groove 8 formed in the cap 1 whereby said plate 9 is held against longitudinal movement and against lateral movement in one direction.

When the socket is arranged for use, the cap or body portion 1 is engaged with the outer end of a spoke, as 7, and is secured in place on said end by a bolt 6 which is passed through the alined apertures 5 formed in the opposite sides of said cap. The heads of these rivets or bolts are preferably countersunk to lie flush with the outer sides of the body portion, as shown. After the cap 1 has been engaged with the spoke, the inner end of the spoke is connected with the hub in the usual or any suitable manner and the lug 2 on the cap 1 of the socket is engaged with one side of the wheel rim. With the parts in this position, the wedge plate 9 is forced between the end of the cap member and the inner edge of the rim, with the rib 13 slidably engaged with the groove 8 until the lug 10 of said plate is engaged with the adjacent side of the wheel rim in position directly opposite to the lug 2 of the cap. A hole bored through the rim in alinement with the bolt holes in the outer ends of the lugs 2 and 10 and through said holes the bolt or rivet 4 is inserted, the ends thereof being preferably countersunk in the lugs to lie flush with the outer faces thereof.

It will be obvious that with the use of a socket constructed as herein shown and described, a spoke may be readily removed from the wheel and another inserted without removing the tire and rim, thus saving a great amount of time, labor and expense.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

What I claim as my invention:—

In a spoke socket, a tubular spoke engaging cap having a closed outer end with its inner face formed at an oblique angle to the body portion thereof, an undercut groove extending transversely across said oblique outer face, an apertured rim engaging ear extending upwardly from one side of said cap at a point opposite one end of said groove, a combined wedge plate and rim engaging member having a transversely extending undercut rib arranged on its lower face for engagement with the groove on the outer face of said cap and provided with an upwardly extending apertured ear arranged over one end of said rib.

In testimony whereof I have hereunto set my hand in presence of two subscribing witnesses.

JOHN MARKWICK.

Witnesses:
 FREDERICK MARKWICK,
 G. W. MACKRETH.